(12) United States Patent
Loehr et al.

(10) Patent No.: US 12,069,739 B2
(45) Date of Patent: *Aug. 20, 2024

(54) FEEDBACK FOR A SYSTEM INFORMATION REQUEST

(71) Applicant: Motorola Mobility LLC, Chicago, IL (US)

(72) Inventors: Joachim Loehr, Wiesbaden (DE); Prateek Basu Mallick, Dreieich (DE); Ravi Kuchibhotla, Chicago, IL (US)

(73) Assignee: Motorola Mobility LLC, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/323,338

(22) Filed: May 24, 2023

(65) Prior Publication Data

US 2023/0300899 A1    Sep. 21, 2023

Related U.S. Application Data

(63) Continuation of application No. 16/906,558, filed on Jun. 19, 2020, now Pat. No. 11,700,642, which is a continuation of application No. 15/464,086, filed on Mar. 20, 2017, now Pat. No. 10,834,759.

(51) Int. Cl.
| | |
|---|---|
| *H04W 4/00* | (2018.01) |
| *H04L 1/1867* | (2023.01) |
| *H04W 72/23* | (2023.01) |
| *H04W 74/0833* | (2024.01) |

(52) U.S. Cl.
CPC ......... *H04W 74/0833* (2013.01); *H04L 1/188* (2013.01); *H04L 1/189* (2013.01); *H04W 72/23* (2023.01)

(58) Field of Classification Search
None
See application file for complete search history.

(56) References Cited

U.S. PATENT DOCUMENTS

| | | |
|---|---|---|
| 9,107,173 B2 | 8/2015 | Gao et al. |
| 9,277,583 B2 | 3/2016 | Ramos et al. |
| 10,075,279 B2 | 9/2018 | Yang et al. |
| 2010/0238859 A1 | 9/2010 | Vukovic et al. |

(Continued)

FOREIGN PATENT DOCUMENTS

| | | |
|---|---|---|
| EP | 2265077 A1 | 12/2010 |
| WO | 2014129951 A1 | 8/2014 |

(Continued)

OTHER PUBLICATIONS

CATT, "On-demand SI Request Transmission", 3GPP TSF-RAN WG2 #97 R2-1701490, Feb. 13-17, 2017, pp. 1-4.

(Continued)

*Primary Examiner* — Zewdu A Beyen
(74) *Attorney, Agent, or Firm* — Kunzler Bean & Adamson

(57) ABSTRACT

Apparatuses, methods, and systems are disclosed for sending and/or receiving feedback for a system information request. One apparatus includes a transmitter that transmits information indicating a request for system information. The apparatus includes a processor that monitors, during a predetermined time period, for a feedback response indicating that the request for the system information was received.

19 Claims, 7 Drawing Sheets

(56) References Cited

U.S. PATENT DOCUMENTS

| | | |
|---|---|---|
| 2010/0272035 A1 | 10/2010 | Park et al. |
| 2011/0051660 A1 | 3/2011 | Arora et al. |
| 2011/0317777 A1 | 12/2011 | Huang et al. |
| 2012/0069788 A1 | 3/2012 | Shen et al. |
| 2012/0176951 A1 | 7/2012 | Pradas et al. |
| 2012/0320842 A1 | 12/2012 | Jeong et al. |
| 2013/0272148 A1 | 10/2013 | Fong et al. |
| 2013/0279363 A1 | 10/2013 | Huang et al. |
| 2014/0086224 A1 | 3/2014 | Kwon et al. |
| 2014/0126520 A1 | 5/2014 | Quan et al. |
| 2014/0153534 A1 | 6/2014 | Kim et al. |
| 2015/0016433 A1 | 1/2015 | Ramos et al. |
| 2015/0296509 A1 | 10/2015 | Yang et al. |
| 2016/0056934 A1 | 2/2016 | Li et al. |
| 2016/0234736 A1 | 8/2016 | Kubota et al. |
| 2016/0249259 A1 | 8/2016 | Park et al. |
| 2017/0079064 A1 | 3/2017 | Yang et al. |
| 2017/0251500 A1 | 8/2017 | Agiwal et al. |
| 2017/0311285 A1 | 10/2017 | Ly et al. |
| 2018/0070403 A1 | 3/2018 | Uemura et al. |
| 2018/0077696 A1 | 3/2018 | Lee et al. |
| 2018/0077729 A1 | 3/2018 | Lee et al. |
| 2018/0103369 A1 | 4/2018 | Chou |
| 2018/0124601 A1 | 5/2018 | Vutukuri |
| 2018/0124636 A1 | 5/2018 | Ly et al. |
| 2018/0124822 A1 | 5/2018 | Wang et al. |
| 2018/0132168 A1 | 5/2018 | Ingale et al. |
| 2018/0199267 A1* | 7/2018 | Lin ................. H04W 48/14 |
| 2018/0212736 A1 | 7/2018 | Chatterjee et al. |
| 2018/0220288 A1 | 8/2018 | Agiwal et al. |
| 2018/0270791 A1 | 9/2018 | Park et al. |
| 2018/0270855 A1 | 9/2018 | Loehr et al. |
| 2018/0270866 A1 | 9/2018 | Loehr et al. |
| 2018/0270894 A1 | 9/2018 | Park et al. |
| 2018/0343679 A1 | 11/2018 | Sahlin et al. |
| 2019/0174554 A1 | 6/2019 | Deenoo et al. |
| 2019/0239277 A1 | 8/2019 | Liu et al. |
| 2019/0261421 A1 | 8/2019 | Peisa et al. |
| 2019/0289533 A1 | 9/2019 | Kim |
| 2019/0349787 A1 | 11/2019 | Kim et al. |
| 2019/0357172 A1 | 11/2019 | Park et al. |

FOREIGN PATENT DOCUMENTS

| | | |
|---|---|---|
| WO | 2015122737 A1 | 8/2015 |
| WO | 2016198909 A1 | 12/2016 |

OTHER PUBLICATIONS

Interdigital Communications, "Procedure for Request and Acquisition of Other-SI", 3GPP TSG-RAN WG2 Meeting #97bis, R2-1702877, Apr. 3-7, 2017, pp. 1-4.

Samsung, "On Demand SI Delivery: Signaling Aspects", 3GPP TSG-RAN WG2 #96, R2-167563, Nov. 14-18, 2016, pp. 1-4.

Samsung, "System Information Signalling Design in NR", 3GPP TSG-RAN WG2 Meeting #95, R2-164693, Aug. 22-26, 2016, pp. 1-6.

* cited by examiner

FEEDBACK FOR A SYSTEM INFORMATION REQUEST

CROSS REFERENCE TO RELATED APPLICATIONS

This application is a continuation of application Ser. No. 16/906,558 filed on Jun. 19, 2020, which is a continuation of application Ser. No. 15/464,086 filed on Mar. 20, 2017 for Joachim Loehr, all of which are incorporated herein by reference in their entirety.

FIELD

The subject matter disclosed herein relates generally to wireless communications and more particularly relates to feedback for a system information request.

BACKGROUND

The following abbreviations are herewith defined, at least some of which are referred to within the following description: Third Generation Partnership Project ("3GPP"), Positive-Acknowledgment ("ACK"), Binary Phase Shift Keying ("BPSK"), Clear Channel Assessment ("CCA"), Cyclic Prefix ("CP"), Channel State Information ("CSI"), Common Search Space ("CSS"), Discrete Fourier Transform Spread ("DFTS"), Downlink Control Information ("DCI"), Downlink ("DL"), Downlink Pilot Time Slot ("DwPTS"), Enhanced Clear Channel Assessment ("eCCA"), Enhanced Mobile Broadband ("eMBB"), Evolved Node B ("eNB"), European Telecommunications Standards Institute ("ETSI"), Frame Based Equipment ("FBE"), Frequency Division Duplex ("FDD"), Frequency Division Multiple Access ("FDMA"), Guard Period ("GP"), Hybrid Automatic Repeat Request ("HARQ"), Internet-of-Things ("IoT"), Licensed Assisted Access ("LAA"), Load Based Equipment ("LBE"), Listen-Before-Talk ("LBT"), Long Term Evolution ("LTE"), Multiple Access ("MA"), Modulation Coding Scheme ("MCS"), Machine Type Communication ("MTC"), Multiple Input Multiple Output ("MIMO"), Multi User Shared Access ("MUSA"), Narrowband ("NB"), Negative-Acknowledgment ("NACK") or ("NAK"), Next Generation Node B ("gNB"), Non-Orthogonal Multiple Access ("NOMA"), Orthogonal Frequency Division Multiplexing ("OFDM"), Primary Cell ("PCell"), Physical Broadcast Channel ("PBCH"), Physical Downlink Control Channel ("PDCCH"), Physical Downlink Shared Channel ("PDSCH"), Pattern Division Multiple Access ("PDMA"), Physical Hybrid ARQ Indicator Channel ("PHICH"), Physical Random Access Channel ("PRACH"), Physical Resource Block ("PRB"), Physical Uplink Control Channel ("PUCCH"), Physical Uplink Shared Channel ("PUSCH"), Quality of Service ("QoS"), Quadrature Phase Shift Keying ("QPSK"), Radio Resource Control ("RRC"), Random Access Procedure ("RACH"), Random Access Response ("RAR"), Reference Signal ("RS"), Resource Spread Multiple Access ("RSMA"), Round Trip Time ("RTT"), Receive ("RX"), Sparse Code Multiple Access ("SCMA"), Scheduling Request ("SR"), Single Carrier Frequency Division Multiple Access ("SC-FDMA"), Secondary Cell ("SCell"), Shared Channel ("SCH"), Signal-to-Interference-Plus-Noise Ratio ("SINR"), System Information Block ("SIB"), Transport Block ("TB"), Transport Block Size ("TBS"), Time-Division Duplex ("TDD"), Time Division Multiplex ("TDM"), Transmission Time Interval ("TTI"), Transmit ("TX"), Uplink Control Information ("UCI"), User Entity/Equipment (Mobile Terminal) ("UE"), Uplink ("UL"), Universal Mobile Telecommunications System ("UMTS"), Uplink Pilot Time Slot ("UpPTS"), Ultra-reliability and Low-latency Communications ("URLLC"), and Worldwide Interoperability for Microwave Access ("WiMAX"). As used herein, "HARQ-ACK" may represent collectively the Positive Acknowledge ("ACK") and the Negative Acknowledge ("NAK"). ACK means that a TB is correctly received while NAK means a TB is erroneously received.

In certain wireless communications networks, some system information may be transmitted and/or received more often than is necessary. In certain configurations, to reduce the signaling load for providing system information, a minimum amount of system information may be used. The minimum system information ("SI") may contain basic information for initial access to the cell (e.g., subframe number, list of public land mobile networks ("PLMNs"), cell camping parameters, RACH parameters) that is broadcast periodically in a cell. In some configurations, the other non-minimum SI doesn't necessarily need to be periodically broadcast (e.g., it may be a network decision). In various configurations, the other SI may be provided on-demand to UEs (e.g., a UE may request it). Delivery of other SI may be done in a broadcast or unicast manner. In some configurations, the minimum SI may indicate whether a specific SIB is periodically broadcasted or provided on-demand. To obtain the one or more SIBs which are not periodically broadcasted and are provided on-demand, a UE may initiate an on-demand SI acquisition procedure (e.g., SI request). For an SI used by the UE, the UE may determine whether it is available in the cell and whether it is broadcast or not before it sends a request for it. The scheduling information for other SI may be provided by the minimum SI (e.g., an SIB type, validity information, periodicity, SI-window information, etc.).

In various configurations, a UE may not be aware whether an SI request is correctly detected by a gNB and may unnecessarily monitor during the SI window for the delivery of the requested SI. Accordingly, a UE battery may drain unnecessarily and there may be an increase in latency for the SI provisioning.

BRIEF SUMMARY

Apparatuses for transmitting and/or receiving feedback for a system information request are disclosed. Methods and systems also perform the functions of the apparatus. In one embodiment, the apparatus includes a transmitter that transmits information indicating a request for system information. In certain embodiments, the apparatus includes a processor that monitors, during a predetermined time period, for a feedback response indicating that the request for the system information was received.

In one embodiment, the apparatus includes a receiver that receives scheduling information corresponding to the system information. In a further embodiment, in response to receiving the feedback response, the receiver receives the system information based on the scheduling information. In certain embodiments, in response to not receiving the feedback response: the transmitter retransmits information indicating the request for the system information; and the processor monitors, during the predetermined time period, for the feedback response indicating that the request for the system information was received. In various embodiments, the transmitter retransmits the information using increased power. In some embodiments, the transmitter repeats retransmitting information indicating the request for the system information up to a predetermined number of times.

In certain embodiments, the feedback response is part of downlink control information. In some embodiments, a radio network temporary identifier is used to indicate the feedback response. In various embodiments, the feedback response is indicated by one or more fields of downlink control information set to one or more predefined values. In one embodiment, the feedback response is part of a random access response message transmitted on a physical downlink shared channel. In certain embodiments, the information indicating the request for the system information includes a physical random access channel preamble.

In some embodiments, the feedback response includes a physical random access channel preamble identifier corresponding to the physical random access channel preamble. In various embodiments, the information indicating the request for the system information is part of a message 3 transmission during random access. In certain embodiments, the information indicating the request for the system information includes a bitmap indicating the requested system information. In one embodiment, the feedback response includes information indicating the requested system information. In some embodiments, the feedback response is part of a contention resolution message during random access. In various embodiments, downlink scheduling information for the system information is transmitted with the feedback response.

A method for receiving feedback for a system information request, in one embodiment, includes transmitting information indicating a request for system information. In various embodiments, the method includes monitoring, during a predetermined time period, for a feedback response indicating that the request for the system information was received.

In one embodiment, an apparatus includes a receiver that receives information indicating a request for system information. In various embodiments, the apparatus includes a transmitter that transmits a feedback response indicating that the request for the system information was received.

In one embodiment, the transmitter transmits scheduling information corresponding to the system information. In a further embodiment, the transmitter transmits the system information based on the scheduling information. In certain embodiments, the feedback response is part of downlink control information. In some embodiments, a radio network temporary identifier is used to indicate the feedback response. In various embodiments, the feedback response is indicated by one or more fields of downlink control information set to one or more predefined values. In one embodiment, the feedback response is part of a random access response message transmitted on a physical downlink shared channel. In certain embodiments, the information indicating the request for the system information includes a physical random access channel preamble.

In some embodiments, the feedback response includes a physical random access channel preamble identifier corresponding to the physical random access channel preamble. In various embodiments, the information indicating the request for the system information is part of a message 3 transmission during random access. In certain embodiments, the information indicating the request for the system information includes a bitmap indicating the requested system information. In one embodiment, the feedback response includes information indicating the requested system information. In some embodiments, the feedback response is part of a contention resolution message during random access. In various embodiments, downlink scheduling information for the system information is transmitted with the feedback response.

A method for transmitting feedback for a system information request, in one embodiment, includes receiving information indicating a request for system information. In some embodiments, the method includes transmitting a feedback response indicating that the request for the system information was received.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
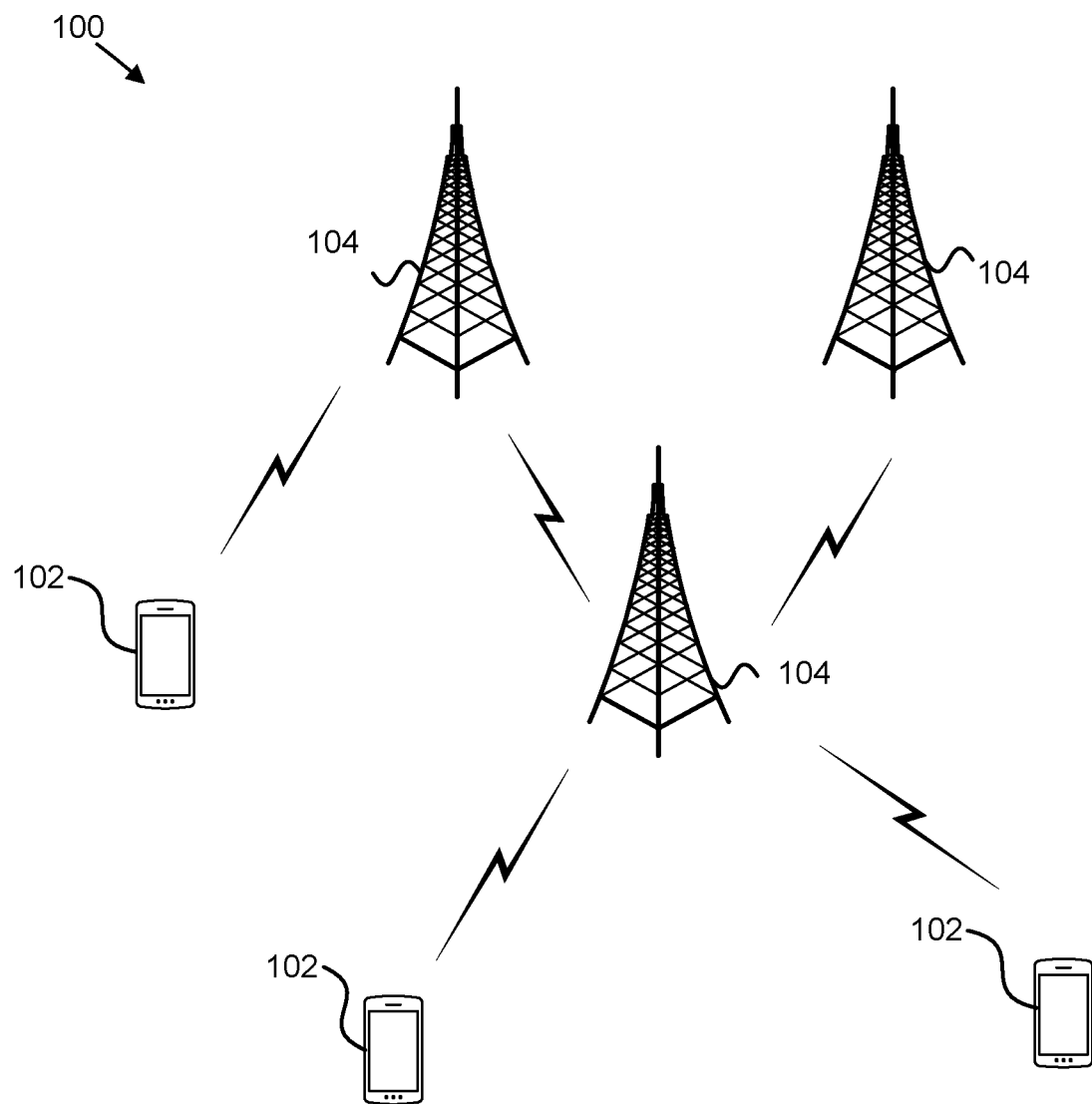
FIG. 1 is a schematic block diagram illustrating one embodiment of a wireless communication system for transmitting and/or receiving feedback for a system information request.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification may be labeled as modules, in order to more particularly emphasize their implementation independence. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be any number of lines and may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. The code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 depicts an embodiment of a wireless communication system 100 for transmitting and/or receiving feedback for a system information request. In one embodiment, the wireless communication system 100 includes remote units 102 and base units 104. Even though a specific number of remote units 102 and base units 104 are depicted in FIG. 1, one of skill in the art will recognize that any number of remote units 102 and base units 104 may be included in the wireless communication system 100.

In one embodiment, the remote units 102 may include computing devices, such as desktop computers, laptop computers, personal digital assistants ("PDAs"), tablet computers, smart phones, smart televisions (e.g., televisions connected to the Internet), set-top boxes, game consoles, security systems (including security cameras), vehicle on-board computers, network devices (e.g., routers, switches, modems), or the like. In some embodiments, the remote units 102 include wearable devices, such as smart watches, fitness bands, optical head-mounted displays, or the like. Moreover, the remote units 102 may be referred to as subscriber units, mobiles, mobile stations, users, terminals, mobile terminals, fixed terminals, subscriber stations, UE, user terminals, a device, or by other terminology used in the art. The remote units 102 may communicate directly with one or more of the base units 104 via UL communication signals.

The base units 104 may be distributed over a geographic region. In certain embodiments, a base unit 104 may also be referred to as an access point, an access terminal, a base, a base station, a Node-B, an eNB, a gNB, a Home Node-B, a relay node, a device, or by any other terminology used in the art. The base units 104 are generally part of a radio access network that includes one or more controllers communicably coupled to one or more corresponding base units 104. The radio access network is generally communicably coupled to one or more core networks, which may be coupled to other networks, like the Internet and public switched telephone networks, among other networks. These and other elements of radio access and core networks are not illustrated but are well known generally by those having ordinary skill in the art.

In one implementation, the wireless communication system 100 is compliant with the LTE protocols standardized in 3GPP, wherein the base unit 104 transmits using an OFDM modulation scheme on the DL and the remote units 102 transmit on the UL using a SC-FDMA scheme or an OFDM scheme. More generally, however, the wireless communication system 100 may implement some other open or proprietary communication protocol, for example, WiMAX, among other protocols. The present disclosure is not intended to be limited to the implementation of any particular wireless communication system architecture or protocol.

The base units 104 may serve a number of remote units 102 within a serving area, for example, a cell or a cell sector via a wireless communication link. The base units 104 transmit DL communication signals to serve the remote units 102 in the time, frequency, and/or spatial domain.

In one embodiment, a base unit 104 may receive information indicating a request for system information from the remote unit 102. In certain embodiments, the base unit 104 may transmit to the remote unit 102 a feedback response indicating that the request for the system information was received. Accordingly, a base unit 104 may be used for transmitting feedback for a system information request.

In another embodiment, a remote unit 102 may transmit information indicating a request for system information. The remote unit 102 may monitor, during a predetermined time period, for a feedback response indicating that the request for the system information was received. Accordingly, a remote unit 102 may be used for receiving feedback for a system information request.

Figure 2:
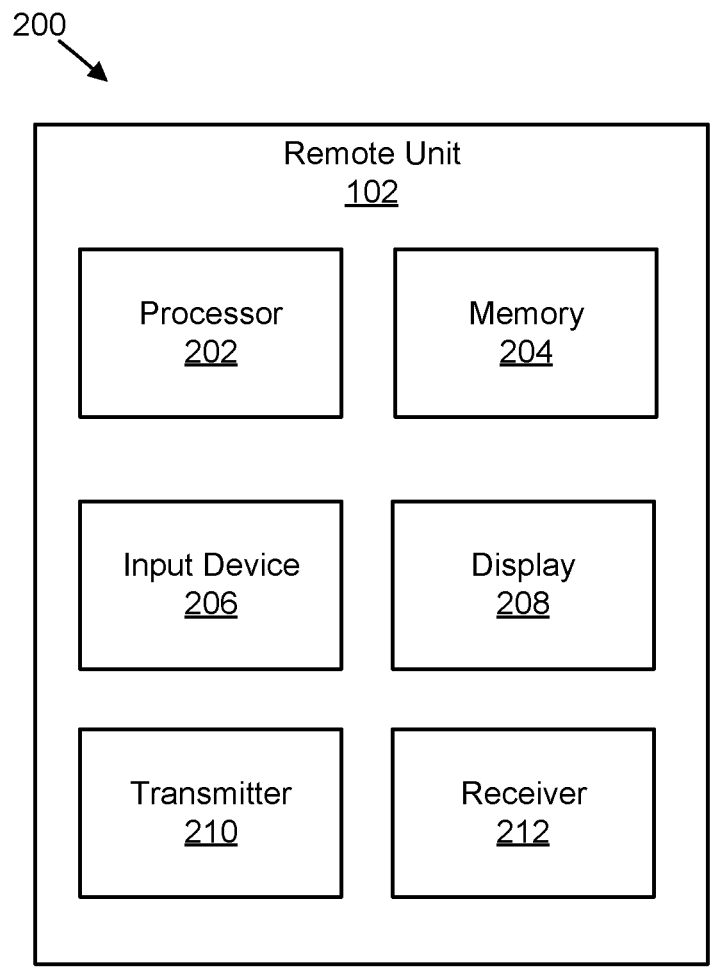
FIG. 2 is a schematic block diagram illustrating one embodiment of an apparatus that may be used for receiving feedback for a system information request.

FIG. 2 depicts one embodiment of an apparatus 200 that may be used for receiving feedback for a system information request. The apparatus 200 includes one embodiment of the remote unit 102. Furthermore, the remote unit 102 may include a processor 202, a memory 204, an input device 206, a display 208, a transmitter 210, and a receiver 212. In some embodiments, the input device 206 and the display 208 are combined into a single device, such as a touchscreen. In certain embodiments, the remote unit 102 may not include any input device 206 and/or display 208. In various embodiments, the remote unit 102 may include one or more of the processor 202, the memory 204, the transmitter 210, and the receiver 212, and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. In various embodiments, the processor 202 monitors, during a predetermined time period, for a feedback response indicating that a request for system information was received. The processor 202 is communicatively coupled to the memory 204, the input device 206, the display 208, the transmitter 210, and the receiver 212.

The memory 204, in one embodiment, is a computer readable storage medium. In some embodiments, the memory 204 includes volatile computer storage media. For example, the memory 204 may include a RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 stores data relating to system information. In some embodiments, the memory 204 also stores program code and related data, such as an operating system or other controller algorithms operating on the remote unit 102.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel.

The display 208, in one embodiment, may include any known electronically controllable display or display device. The display 208 may be designed to output visual, audible, and/or haptic signals. In some embodiments, the display 208 includes an electronic display capable of outputting visual data to a user. For example, the display 208 may include, but is not limited to, an LCD display, an LED display, an OLED display, a projector, or similar display device capable of outputting images, text, or the like to a user. As another, non-limiting, example, the display 208 may include a wearable display such as a smart watch, smart glasses, a heads-up display, or the like. Further, the display 208 may be a component of a smart phone, a personal digital assistant, a television, a table computer, a notebook (laptop) computer, a personal computer, a vehicle dashboard, or the like.

In certain embodiments, the display 208 includes one or more speakers for producing sound. For example, the display 208 may produce an audible alert or notification (e.g., a beep or chime). In some embodiments, the display 208 includes one or more haptic devices for producing vibrations, motion, or other haptic feedback. In some embodiments, all or portions of the display 208 may be integrated with the input device 206. For example, the input device 206 and display 208 may form a touchscreen or similar touch-sensitive display. In other embodiments, the display 208 may be located near the input device 206.

The transmitter 210 is used to provide UL communication signals to the base unit 104 and the receiver 212 is used to receive DL communication signals from the base unit 104. In various embodiments, the transmitter 210 may be used to transmit information indicating a request for system information. Although only one transmitter 210 and one receiver 212 are illustrated, the remote unit 102 may have any suitable number of transmitters 210 and receivers 212. The transmitter 210 and the receiver 212 may be any suitable type of transmitters and receivers. In one embodiment, the transmitter 210 and the receiver 212 may be part of a transceiver.

Figure 3:
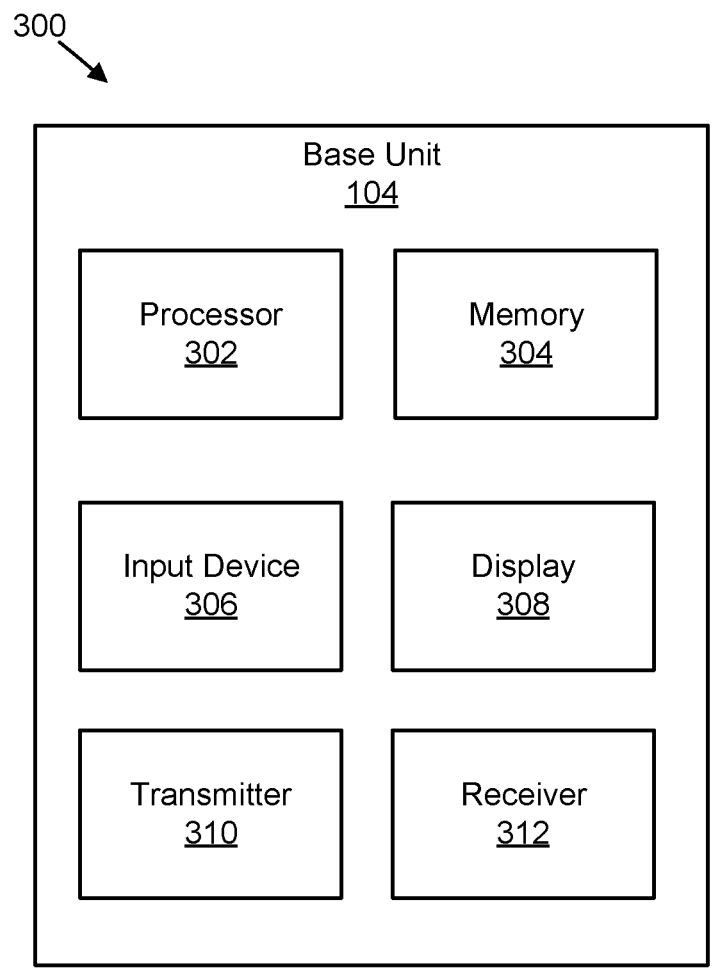
FIG. 3 is a schematic block diagram illustrating one embodiment of an apparatus that may be used for transmitting feedback for a system information request.

FIG. 3 depicts one embodiment of an apparatus 300 that may be used for transmitting feedback for a system information request. The apparatus 300 includes one embodiment of the base unit 104. Furthermore, the base unit 104 may include a processor 302, a memory 304, an input device 306, a display 308, a transmitter 310, and a receiver 312. As may be appreciated, the processor 302, the memory 304, the input device 306, the display 308, the transmitter 310, and the receiver 312 may be substantially similar to the processor 202, the memory 204, the input device 206, the display 208, the transmitter 210, and the receiver 212 of the remote unit 102, respectively.

In various embodiments, the receiver 312 is used to receive information from the remote unit 102 indicating a request for system information. In some embodiments, the transmitter 310 may be used to transmit a feedback response to the remote unit 102 indicating that the request for the system information was received. Although only one transmitter 310 and one receiver 312 are illustrated, the base unit 104 may have any suitable number of transmitters 310 and receivers 312. The transmitter 310 and the receiver 312 may be any suitable type of transmitters and receivers. In one embodiment, the transmitter 310 and the receiver 312 may be part of a transceiver.

Figure 4:
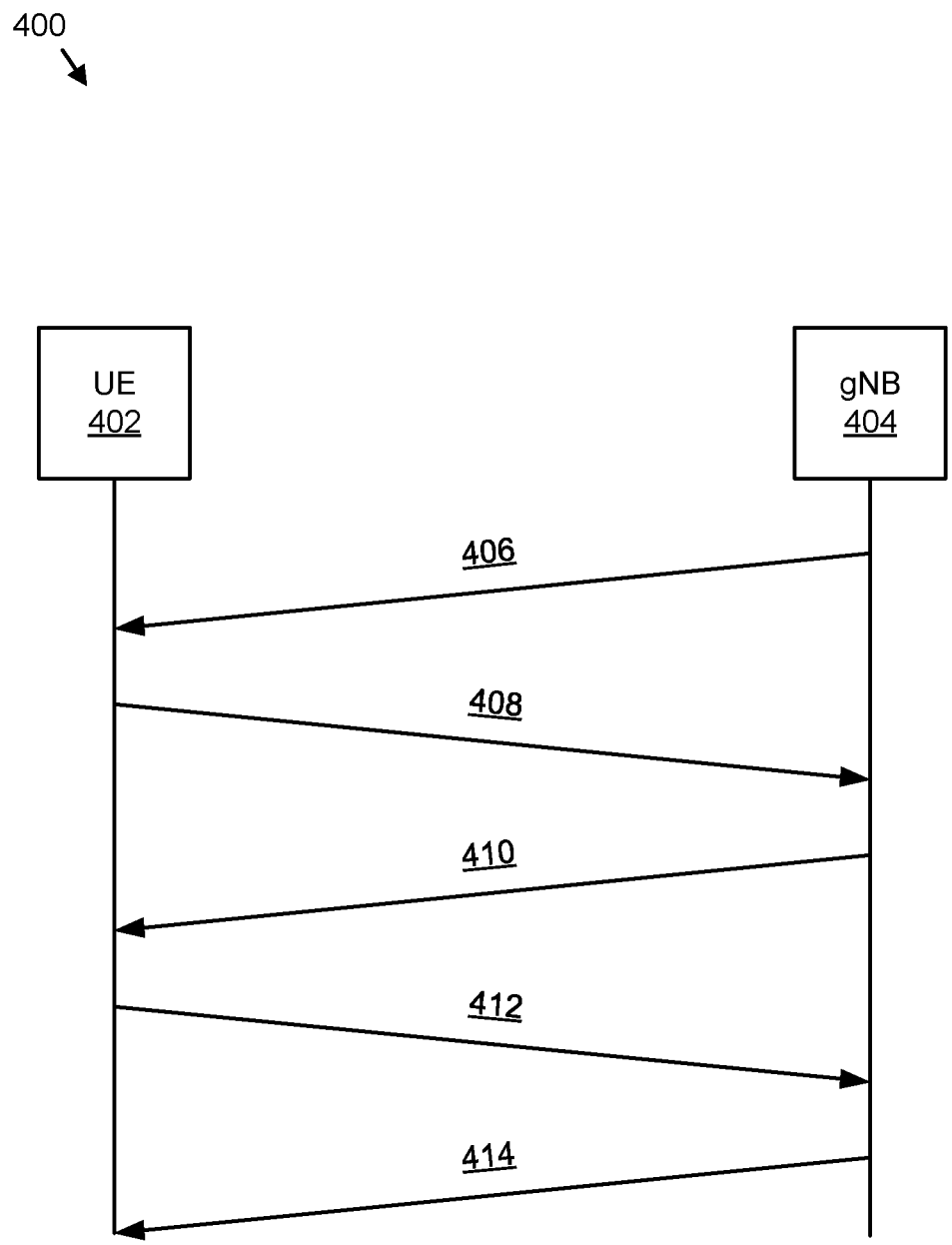
FIG. 4 illustrates one embodiment of communications for transmitting and receiving feedback for a system information request.

FIG. 4 illustrates one embodiment of communications 400 for transmitting and receiving feedback for a system information request. Specifically, communications 400 between a UE 402 and a gNB 404 are illustrated. The communications 400 may facilitate the UE 402 requesting on-demand SIBs using a RACH message 3 based approach.

In certain embodiments, the gNB 404 may transmit a periodic broadcast 406 to the UE 402. The periodic broadcast 406 may include minimum SI used by the UE 402 for communication. In various embodiments, the UE 402 may transmit a PRACH preamble 408 to the gNB 404. In some embodiments, in response to transmitting the PRACH preamble 408, the gNB 404 may transmit an UL grant in a random access response 410. After receiving the random access response 410, the UE 402 may transmit a system information ("SI") request 412 to the gNB 404 that indicates on-demand SIBs requested by the UE 402. The system information request 412 may be a random access message 3. As may be appreciated, the on-demand SIBs may not be broadcast (e.g., transmitted) unless requested. In response to the system information request 412, the gNB 404 may transmit a feedback response 414 that indicates that the system information request 412 was received by the gNB 404.

In certain embodiments, because message 3 is a UL-SCH transmission (e.g., medium access control ("MAC") protocol data unit ("PDU")) more information may be provided by the UE 402 within the message 3 than in a PRACH preamble. In one embodiment, the UE 402 includes a MAC control element ("CE") within the RACH message 3 to convey the SI request information. In such an embodiment, the MAC CE may contain a bitmap indicating the SI(s)/SIB (s) that the UE 402 wants to acquire. Moreover, the bitmap may have an entry for all on-demand SI(s)/SIB(s) (e.g., all SIBs not broadcast in the cell). Using the bitmap, the UE 402 may indicate (e.g., by setting the corresponding field/bit to a predefined value) which of the SI(s)/SIB(s) it wants to acquire. In certain embodiments, the UE 402 requests system information not only for the current cell, (e.g., cell UE is camped on/connected with) but also for neighboring cells. In one embodiment, the UE 402 includes information within the message 3 (e.g., SI request message) which indicates that the gNB 404 should provide to UE 402 all system information used in a predetermined area, covering one or multiple cells. In certain embodiments, the UE 402 may include an RRC message within the message 3 to convey SI request information. In such an embodiment, the RRC message may contain the SI(s)/SIB(s) that the UE 402 wants to acquire.

In various embodiments, some SI may be related to the UE's 402 capability and so indicating such capability might provide useful information to the gNB 404 as to whether related SI information is to be transmitted to the UE 402 in response or not. In certain embodiments, to allow the gNB 404 to allocate sufficient uplink resources for transmission of the SI-request bitmap MAC CE in message 3, one or more PRACH preambles may be used to indicate that the purpose of the RACH procedure is for on-demand SI acquisition. In various embodiments, the size of message 3 (e.g., the system information request 412) might be different for an initial Access and an SI-request (e.g., message 3 for on-demand SI acquisition may only include the system information request message, but no further information like an identity identifying the UE or some buffer status report). In certain embodiments the content of the RACH response message (e.g., RACH message 2), which is sent by gNB in response to receiving a PRACH preamble may be different for a RACH procedure with the purpose for on-demand SI acquisition than for a RACH procedure for another purpose. In some embodiments, because more than one UE may send an identical reserved PRACH preambles for SI request, a collision of message 3 may occur (e.g., multiple UEs are sending SI-request MAC CE (with different content) on UL resources allocated in RACH message 3). Accordingly, in certain embodiments, collision/contention resolution may be used to enable the UE 402 to know whether the transmitted SI request was received by gNB 404. In one embodiment, the gNB 404 may send in RACH message 4 (e.g., the feedback response 414) the SI-request bitmap MAC CE which it received in message 3. This will enable the UE 402 to identify whether its SI-request was correctly received by the gNB 404. In various embodiments, the gNB 404 could include the requested SIB(s)/SI(s) in the RACH message 4 as part of the feedback response 414 (e.g., RRC message). In some embodiments, upon reception of RACH message 4, the UE 402 may check, by decoding the MAC CE, whether the requested SIB(s)/SI(s) are included (e.g., checking whether the received MAC CE matches the SI-request MAC CE sent in message 3). In embodiments in which the MAC CE matches the SI-request MAC CE, the SIB(s)/SI(s) may be delivered to the RRC. In embodiments in which the MAC CE does not match the request, the UE 402 may trigger the SI acquisitions procedure again (e.g., sending PRACH preamble for SI-request, retransmitting the message 3, etc.). Moreover, the UE 402 may, upon transmission of message 3, monitor (e.g., during a certain time window, during a predetermined period of time) for a RACH message 4. In situations in which no RACH message 4 is received during the predetermined period of time the UE 402 may trigger the SI acquisition procedure again (e.g., sending PRACH preamble for SI-request, retransmitting the message 3, etc.).

In various embodiments, the SIB(s)/SI(s) requested by the UE 402 may be broadcast (instead of sending them in message 4). In such embodiments, the RACH message 4 may include the scheduling information which indicates the timing information for the broadcast of the requested SIB (s)/SI(s). Furthermore, in such embodiments, the UE 402 may not read minimum system information in order to acquire the timing information before receiving the broadcasted SIB(s)/SI(s).

In various embodiments, SIB(s)/SI(s) requested by the UE 402 may be partly provided by broadcast and partly within RACH message 4. In one embodiment, the RACH message 4 may include information indicating which SI(s)/SIB(s) are provided by RACH message 4 and which SI(s)/SIB(s) are broadcast (e.g., the UE 402 monitors during the SI window associated with these SI(s)/SIB(s) for receiving the broadcast channel).

In one embodiment, the gNB 404 may send multiple RACH message 4 (e.g., to be provided SI(s)/SIB(s) may not fit within only one downlink transmission). In certain embodiments, an indication is contained within the RACH message 4 (e.g., SI feedback response) indicating whether the UE 402 should continue monitoring for further downlink transmissions (e.g., further RACH message 4 transmissions) for reception of further SI(s)/SIB(s) or whether UE may stop monitoring for further downlink transmissions (e.g., further RACH message 4 transmissions). In one embodiment, this indication is a boolean flag. In various embodiments, the RACH message 4 may include information indicating whether the UE 402, in response to receiving the RACH message, should initiate an RRC connection establishment procedure or an RRC connection resume procedure.

As may be appreciated, one advantage of including the SI-request bitmap MAC CE in message 4 is that collision/contention resolution may be performed on the MAC level. In certain embodiments, the UE 402 may, after sending RACH message 3 and upon receiving a HARQ acknowledgment as the feedback response 414, read the minimum SI and check whether the gNB 404 indicates that the requested SIBs are in response to having received the SI request broadcast in the cell. In such an embodiment, the collision/contention resolution would happen at the minimum SI level.

In some embodiments, the radio network temporary identifier ("RNTI") used for RACH message 4 transmission may indicate the on-demand SIB(s) which are either included in message 4 (e.g., RRC message) or being broadcast. In such embodiments, a certain number of RNTI(s) (e.g., from the cell RNTI ("C-RNTI") space) may be reserved and associated to a specific SIB or a combination of several SIB(s). Moreover, the UE 402 may, upon transmission of message 3, monitor (e.g., during a certain time window, during a predetermined period of time) for a PDCCH addressed to one of those reserved RNTIs. Accordingly, depending on the received PDCCH/RNTI (e.g., the feedback response 414) the UE 402 may be aware of whether its SI request sent in message 3 was received by the gNB 404. In various embodiments, the RNTI used for RACH message 4 may be a common predefined RNTI value. In such embodiments, a common predefined RNTI is used which is specific to the SI-request. Moreover, in such embodiments, no temporary cell RNTI ("T-CRNTI") needs to be allocated/signalled in the RACH response message. In embodiments in which a common RNTI is used, the RACH message 4 (e.g., SI feedback message) may not only be addressed to a single UE but may be addressed to multiple UEs which sent a SI request. As such, each UE which sent a SI request may check based on the common RNTI, whether its request was received by gNB 404. In embodiments in which a common RNTI is used for RACH message 4, the SI feedback message conveyed within RACH message 4 may contain a bitmap which denotes the SIB(s) for which gNB 404 has received a request (e.g., multiple requests from different UEs). As such, each UE which sent a SI request may check, based on the received bitmap, whether its request was received by the gNB 404. In certain embodiments, UEs which have not sent an SI request may monitor for the common RNTI in order to receive the SI feedback message (e.g., RACH message 4) and check the requested SIB(s) so that a UE may not need to request SIB(s) which have been already requested by other UEs.

In certain embodiments described herein, the RACH procedure may be used for the sole purpose of requesting on-demand SI. However, in some embodiments, the UE 402 may establish an RRC connection and at the same request on-demand SI, or the UE 402 in an inactive state may transmit UL data and at the same time trigger an on-demand SI acquisition procedure. In such embodiments, which are just examples, the UE 402 may send the SI-request MAC CE and the RRC connection request message in RACH message 3, or SI-request MAC CE and UL data and potentially some buffer status report ("BSR") MAC CE in RACH message 3. In such embodiments, the gNB 404 may distinguish between the different cases (e.g., SI-request, SI-Request plus initial access, SI-request plus UL data) so that the gNB 404 may dimension the size of the UL grant accordingly. Accordingly, in some embodiments, PRACH preambles may be reserved for identification of the different cases.

Figure 5:
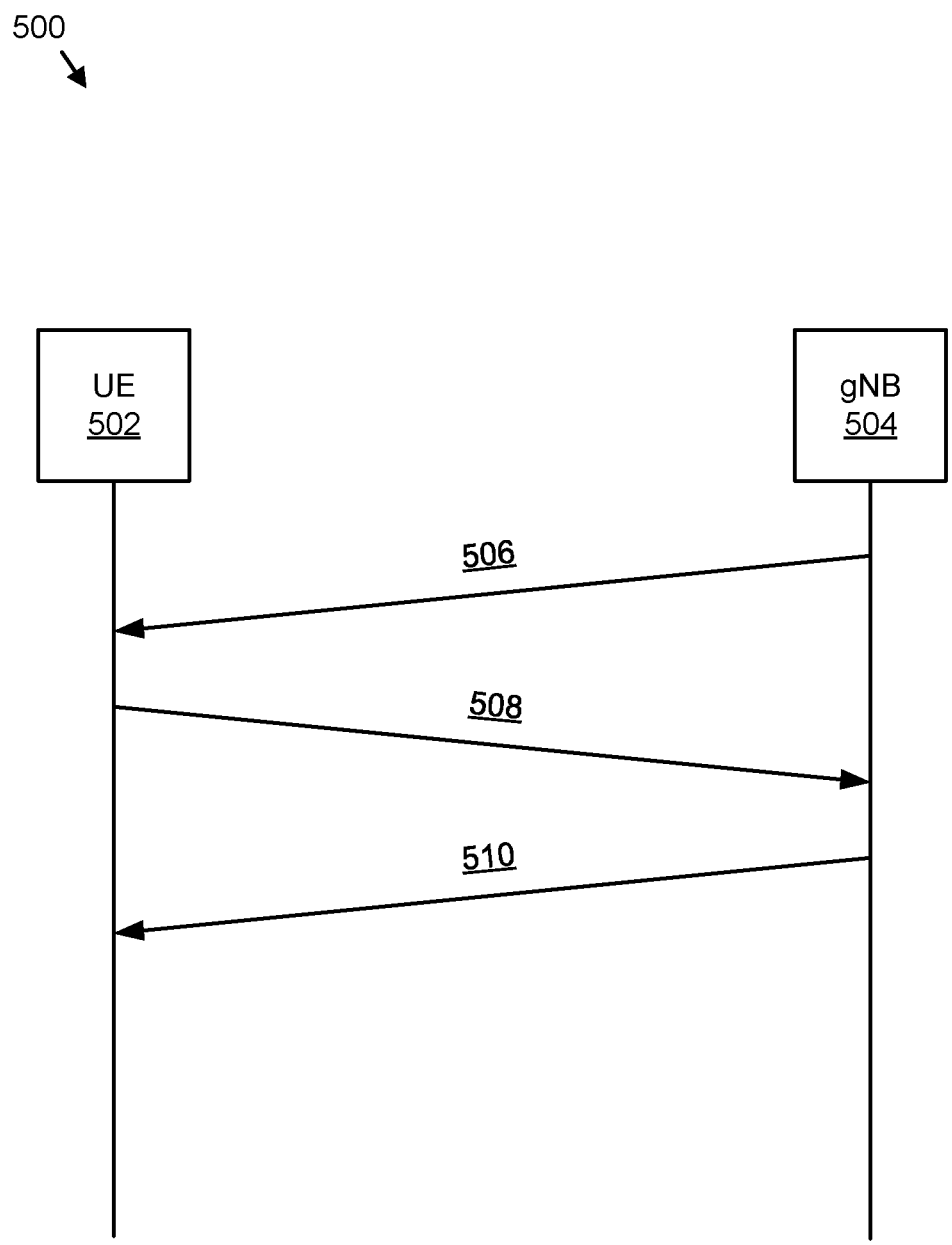
FIG. 5 illustrates another embodiment of communications for transmitting and receiving feedback for a system information request.

FIG. 5 illustrates another embodiment of communications 500 for transmitting and receiving feedback for a system information request. Specifically, communications 500 between a UE 502 and a gNB 504 are illustrated. The communications 500 may facilitate the UE 502 requesting on-demand SIBs using a RACH message 1 based approach.

In certain embodiments, the gNB 504 may transmit a periodic broadcast 506 to the UE 502. The periodic broadcast 506 may include minimum SI used by the UE 502 for communication. In various embodiments, the UE 502 may transmit a PRACH preamble 508 to the gNB 504. The PRACH preamble 508 indicates an SI request to the gNB 504 that indicates on-demand SIBs requested by the UE 502. The PRACH preamble 508 may be a message 1. As may be appreciated, the on-demand SIBs may not be broadcast (e.g., transmitted) unless requested. In response to the PRACH preamble 508, the gNB 504 may transmit a feedback response 510 that indicates that the PRACH preamble 508 was received by the gNB 504.

In certain embodiments, the PRACH preamble 508 is resource specific to an SIB or set of SIBs which the UE 502 wants to obtain. In some embodiments, the PRACH preamble 508 that is resource specific to each SIB or set of SIBs are reserved and indicated in periodically broadcasted minimum SI. In certain embodiments, the UE 502 may request system information not only for the current cell, (e.g., cell UE is camped on/connected with) but also for neighboring cells. In one embodiment, a PRACH preamble 508 indicates that the gNB 504 should provide to UE 502 all system information used in a predetermined area, covering one or multiple cells.

Upon transmission of the PRACH preamble 508 (e.g., the SI request preamble), the UE 502 may monitor for a feedback message (e.g., the feedback response 510) sent from the gNB 504. The UE 502 may monitor for the feedback message during a defined time period (e.g., time window). Upon reception of the feedback message the UE 502 may monitor during a signaled SI window for the requested SI (e.g., as indicated in the scheduling information broadcast in the minimum SI).

In the absence of the feedback message, the UE 502 may assume that the PRACH transmission was not detected by the gNB 504 and may, in certain embodiments, retransmit the PRACH preamble 508 (e.g., SI request). In some embodiments, retransmission of the PRACH preamble 508 may be with an increased transmission power. In various embodiments, a counter is used and is initially set to zero and increased for each PRACH preamble 508 transmission.

In certain embodiments, there may be a maximum number of PRACH preamble 508 transmission attempts defined. In some embodiments, if the maximum number of PRACH preamble 508 transmission attempts is reached the UE 502 may indicate to a higher layer a random access problem (e.g., radio link failure procedure might be started such as for an inactive mode).

In some embodiments, a new physical layer ("PHY") signal may be used to convey the feedback message. In various embodiments, the feedback message itself may include a PRACH preamble identifier field identifying the detected PRACH Preamble 508. In certain embodiments, DCI (e.g., PDCCH) may contain the PRACH preamble 508 ID that was detected by the gNB 504. In one embodiment, a DCI format used for scheduling a downlink data transmission (e.g., format 1A) may be used to transmit the feedback for a received SI request. In some embodiments, a new RNTI value (e.g., SI-Request RNTI) may be used to indicate that the DCI (e.g., PDCCH) contains the SI request feedback message. This may enable the UE 502 to distinguish between a random access response message (e.g., cyclic redundancy check ("CRC") scrambled with random access RNTI ("RA-RNTI")) and the SI-request feedback message (e.g., CRC of PDCCH scrambled with SI-request RNTI). In various embodiments, because no corresponding PDSCH is transmitted (e.g., only PDCCH (DCI)) the DCI itself may contain the PRACH preamble (or an indicator identifying the PRACH preamble 508). In certain embodiments, instead of signaling a detected PRACH preamble 508 ID, the gNB 504 may signal a list of detected PRACH preamble IDs, including the PRACH preambles detected from other UEs. The feedback message may be a common feedback message reflecting the status of received SI requests/PRACH preambles. Accordingly, in such embodiments, the UE 502 may check whether its SI request/SI PRACH preamble was received by the gNB 504. Furthermore, this feedback message may also indicate which SIB(s) the gNB 504 will provide (subsequently) (e.g., by broadcast). In some embodiments, the feedback message (DCI) may contain a bitmap indicating the SIB(s) for which a request was received and which will be provided by broadcast/unicast accordingly.

In various embodiments, the UE 502 may receive a request to perform the random access procedure for a different purpose than for on-demand SI acquisition (e.g., initial access) while also being triggered to perform the SI acquisition. In such embodiments, the UE 502 may deprioritize the RACH procedure for SI request. For example, the UE 502 may first perform the initial access and then retrieve the system information by dedicated signaling (e.g., RRC signaling).

In some embodiments, the SI-request feedback message may be transmitted by means of a PDCCH scrambled with an RA-RNTI (e.g., RACH response). In such embodiments, a predefined value(s) of a field or a combination of fields within the DCI may indicate whether the DCI is used for a normal RACH response or as an SI-request feedback message.

In various embodiments, no PDSCH is necessary to transmit a feedback message (e.g., the feedback is contained in the DCI/PDCCH). In such embodiments, the feedback may be a single PRACH preamble ID, a list of PRACH preamble IDs, a bitmap indicating the requested SIB(s) which will be provided by broadcast. In some embodiments, the RA-RNTI value may be a reserved RA-RNTI value (e.g., not calculated from the time/resource in which the preamble was sent). In such embodiments, the RA-RNTI may be dedicated/specific to the SI request.

In various embodiments, the SI-request feedback is transmitted within the RACH response message transmitted on a PDSCH (e.g., MAC PDU). In some embodiments, the UE 502 monitors upon transmission of the PRACH preamble 508 during the RACH response window for the RACH response message (e.g., PDCCH addressed to RA-RNTI calculated from the time/resource in which preamble was sent). In such embodiments, the RACH response message may be a MAC PDU which consists of a MAC header and corresponding MAC random access responses ("MAC RAR"). In some embodiments, the MAC PDU header includes one or more MAC PDU subheaders. Furthermore, each subheader corresponds to a MAC RAR (e.g., except for the backoff indicator subheader). In one embodiment, the MAC PDU subheader for a RAR contains the PRACH preamble 508 ID field identifying the transmitted random access. In certain embodiments, the RAR message itself includes the following information: Temporary C-RNTI: the gNB 504 gives another identity to the UE 502 which is called temporary C-RNTI for further communication; Timing Advance Value: the gNB 504 informs the UE 502 to change its timing so it can compensate for the round trip delay caused by UE distance from the gNB 504; and/or Uplink Grant Resource: the gNB 504 may assign initial resources to the UE 502 so that it may use UL-SCH.

In certain embodiments, for an SI-request the UE 502 may only need to receive confirmation that the PRACH preamble 508 was detected by the gNB 504. In such embodiments, there may be no consecutive UL-SCH transmission (e.g., message 3) in response to the reception of the SI request feedback message. Accordingly, in such embodiments only a MAC PDU subheader for a RAR containing the PRACH preamble 508 ID field identifying the received PRACH preamble 508 or list of received PRACH preambles is transmitted (e.g., no associated RAR message carrying UL grant, T-CRNTI, TA, etc.).

In some embodiments, the SI-request feedback may be transmitted within the RACH response message transmitted on a PDSCH (e.g., MAC PDU). In such embodiments, the feedback which is transmitted within the RACH response may be a list of PRACH preamble 508 IDs (e.g., identifying all SI request preambles received by gNB), a bitmap, or another indication of the requested SIB(s) which will be provided by gNB. In various embodiments, a new MAC CE may be introduced which contains either a bitmap or a list of the SIB(s) for which gNB received requests. In some embodiments, a reserved RA-RNTI value may be used (e.g., not calculated from the time/resource in which the preamble was sent). This reserved RA-RNTI may be specific to the on-demand SI request.

In various embodiments, the UE 502 may send a PRACH preamble 508 and read minimum SI (e.g., SIB1) in order to check whether the gNB 504 will broadcast the requested SI (e.g., a broadcast/not broadcast indicator may be flipped by the gNB 504 in response to the preamble being detected). In such embodiments, if the minimum SI doesn't indicate that the requested SI is broadcast, the UE 502 may retrigger the SI request procedure (e.g., send the PRACH preamble 508. In such embodiments, the feedback is given by the minimum SI.

In various embodiments, scheduling information for the transmission of a requested on-demand SI/SIB may be transmitted together with the SI-request feedback message. In such embodiments, the scheduling information may denote timing information when the UE 502 should monitor for the requested on-demand SI. In various embodiments, the scheduling information for on-demand SI is provided by minimum SI (e.g., in SIB1, including SIB type, validity information, periodicity, SI-window information). In certain embodiments, when transmitting scheduling info for requested on-demand SI together with the SI feedback message, the gNB 504 may have more flexibility for the transmission of the requested SI. In some embodiments, the requested SI could be transmitted at an earlier time instance compared to the timing info provided by minimum SI (e.g., reduced latency for acquisition of system information). Also in embodiments that include the scheduling information in the same message as the feedback message, the UE 502 doesn't need to read the minimum SI in order to acquire the latest (up-to-date) scheduling info for the on-demand SI. In one embodiment, the scheduling information for the requested SI is carried within an RAR message. Specifically, in such an embodiment, the MAC RAR is associated with a MAC PDU subheader having a random access preamble identity ("RAPID") identifying a transmitted PRACH preamble 508 (e.g., SI-request feedback) and carries the scheduling information for the transmission of the requested on-demand SI. In embodiments in which the feedback message includes the scheduling information, the UE 502 may follow this scheduling information for reception of the requested SI. In such embodiments, the scheduling information provided within the feedback message may take precedence over the scheduling information provided by minimum SI. In various embodiments, when scheduling information for on-demand SI is always provided together with the feedback message, there may be no need to broadcast the scheduling information within minimum SI, which would in turn save signaling overhead.

Figure 6:
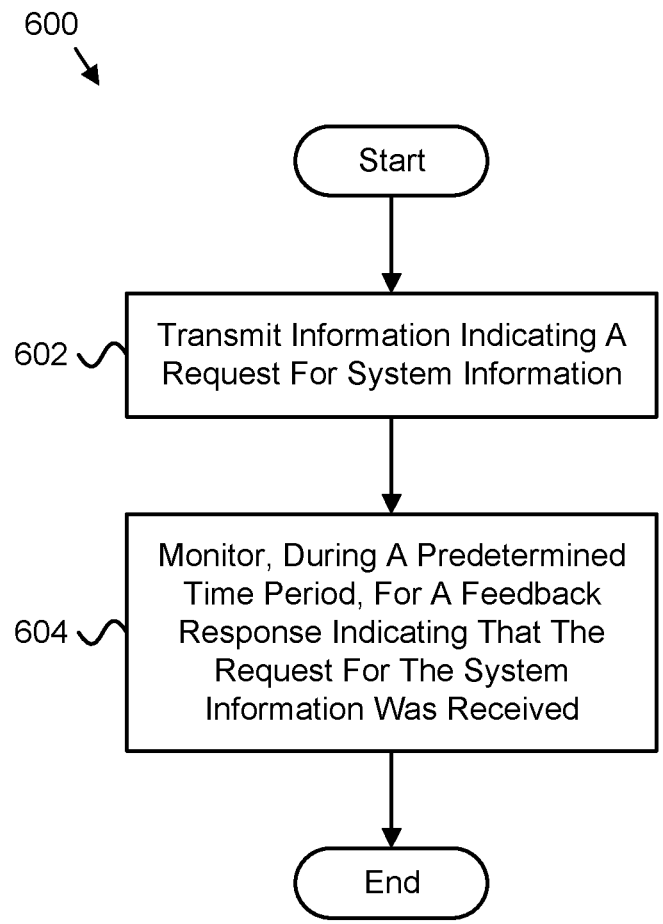
FIG. 6 is a schematic flow chart diagram illustrating one embodiment of a method for receiving feedback for a system information request.

FIG. 6 is a schematic flow chart diagram illustrating one embodiment of a method 600 for receiving feedback for a system information request. In some embodiments, the method 600 is performed by an apparatus, such as the remote unit 102. In certain embodiments, the method 600 may be performed by a processor executing program code, for example, a microcontroller, a microprocessor, a CPU, a GPU, an auxiliary processing unit, a FPGA, or the like.

The method 600 may include transmitting 602 information indicating a request for system information. The method 600 also includes monitoring 604, during a predetermined time period, for a feedback response indicating that the request for the system information was received.

In one embodiment, the method 600 includes receiving scheduling information corresponding to the system information. In a further embodiment, the method 600 includes, in response to receiving the feedback response, receiving the system information based on the scheduling information. In certain embodiments, the method 600 includes, in response to not receiving the feedback response: retransmitting information indicating the request for the system information; and the monitoring, during the predetermined time period, for the feedback response indicating that the request for the system information was received. In various embodiments, retransmitting the information indicating the request for the system information includes retransmitting the information using increased power. In some embodiments, retransmitting the information indicating the request for the system information includes retransmitting information indicating the request for the system information up to a predetermined number of times.

In certain embodiments, the feedback response is part of downlink control information. In some embodiments, a radio network temporary identifier is used to indicate the feedback response. In various embodiments, the feedback response is indicated by one or more fields of downlink control information set to one or more predefined values. In one embodiment, the feedback response is part of a random access response message transmitted on a physical downlink shared channel. In certain embodiments, the information indicating the request for the system information includes a physical random access channel preamble.

In some embodiments, the feedback response includes a physical random access channel preamble identifier corresponding to the physical random access channel preamble. In various embodiments, the information indicating the request for the system information is part of a message 3 transmission during random access. In certain embodiments, the information indicating the request for the system information includes a bitmap indicating the requested system information. In one embodiment, the feedback response includes information indicating the requested system information. In some embodiments, the feedback response is part of a contention resolution message during random access. In various embodiments, downlink scheduling information for the system information is transmitted with the feedback response.

Figure 7:
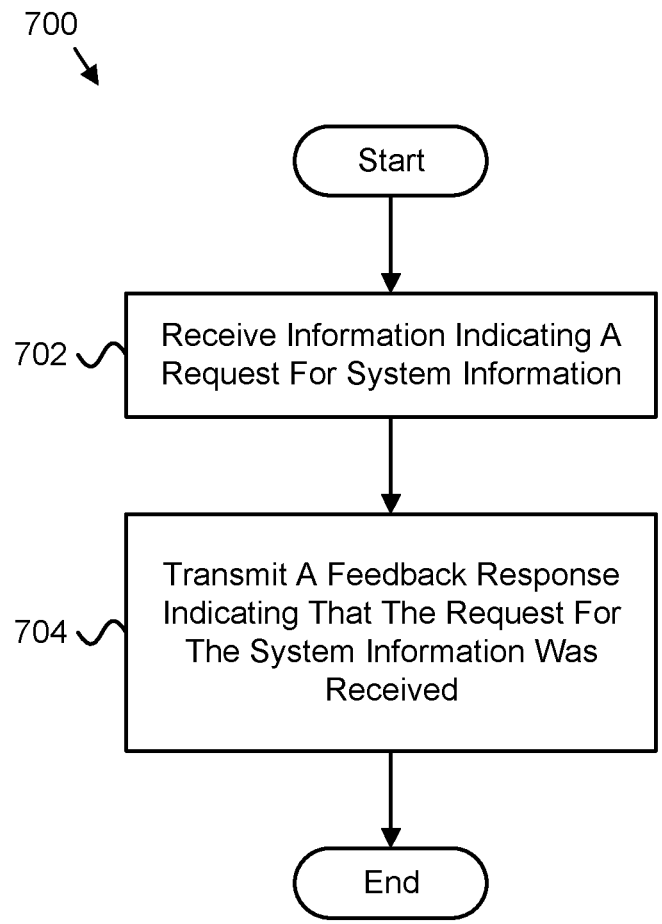
FIG. 7 is a schematic flow chart diagram illustrating one embodiment of a method for transmitting feedback for a system information request.

FIG. 7 is a schematic flow chart diagram illustrating a further embodiment of a method 700 for transmitting feedback for a system information request. In some embodiments, the method 700 is performed by an apparatus, such as the base unit 104. In certain embodiments, the method 700 may be performed by a processor executing program code, for example, a microcontroller, a microprocessor, a CPU, a GPU, an auxiliary processing unit, a FPGA, or the like.

The method 700 may include receiving 702 information indicating a request for system information. The method 700 also includes transmitting 704 a feedback response indicating that the request for the system information was received.

In one embodiment, the method 700 includes transmitting scheduling information corresponding to the system information. In a further embodiment, the method 700 includes transmitting the system information based on the scheduling information.

In certain embodiments, the feedback response is part of downlink control information. In some embodiments, a radio network temporary identifier is used to indicate the feedback response. In various embodiments, the feedback response is indicated by one or more fields of downlink control information set to one or more predefined values. In one embodiment, the feedback response is part of a random access response message transmitted on a physical downlink shared channel. In certain embodiments, the information indicating the request for the system information includes a physical random access channel preamble.

In some embodiments, the feedback response includes a physical random access channel preamble identifier corresponding to the physical random access channel preamble. In various embodiments, the information indicating the request for the system information is part of a message 3 transmission during random access. In certain embodiments, the information indicating the request for the system information includes a bitmap indicating the requested system information. In one embodiment, the feedback response includes information indicating the requested system information. In some embodiments, the feedback response is part of a contention resolution message during random access. In various embodiments, downlink scheduling information for the system information is transmitted with the feedback response.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A user equipment (UE), comprising:
at least one memory; and
at least one processor coupled with the at least one memory and configured to cause the UE to:
transmit information requesting system information, wherein the information comprises a first bitmap indicating the requested system information, wherein the requested system information comprises at least one on-demand system information message of a plurality of system information messages, wherein the plurality of system information messages comprises broadcast system information messages and on-demand system information messages;
monitor for a feedback response in response to the transmitted information, wherein the feedback response comprises a medium access control-control element (MAC-CE); and
receive a contention resolution message including the feedback response comprising an identifier indicating a reception of the transmitted information, wherein the identifier comprises a second bitmap matching the first bitmap indicating the requested system information.

2. The UE of claim 1, wherein the at least one processor is further configured to cause the UE to:
transmit a message 3 (msg3) of a random access procedure, wherein the msg3 includes the information requesting the system information.

3. The UE of claim 1, wherein the at least one processor is further configured to cause the UE to:
transmit a message 3 (msg3) of a random access procedure, wherein the msg3 includes the first bitmap indicating the requested system information.

4. The UE of claim 1, wherein the MAC-CE comprises the first bitmap indicating the requested system information.

5. The UE of claim 1, wherein the at least one processor is further configured to cause the UE to:
receive scheduling information corresponding to the requested system information; and
in response to the received feedback response, receive the requested system information based on the scheduling information.

6. The UE of claim 1, wherein the at least one processor is further configured to cause the UE to:
retransmit the information requesting the system information.

7. The UE of claim 1, wherein the at least one processor is further configured to cause the UE to retransmit the information using an increased power.

8. The UE of claim 1, wherein the feedback response corresponds to a radio network temporary identifier (RNTI).

9. The UE of claim 1, wherein the information requesting the system information comprises a physical random access channel (PRACH) preamble, and wherein the feedback response comprises a PRACH preamble identifier corresponding to the PRACH preamble.

10. The UE of claim 1, wherein the feedback response comprising downlink scheduling information for the requested system information.

11. A method of wireless communication at a user equipment (UE), the method comprising:
- transmitting information requesting system information, wherein the information comprises a first bitmap indicating the requested system, wherein the requested system information comprises at least one on-demand system information message of a plurality of system information messages, wherein the plurality of system information messages comprises broadcast system information messages and on-demand system information messages; and
- monitoring for a feedback response responsive to the transmitted information, wherein the feedback response comprises a medium access control-control element (MAC-CE); and
- receive a contention resolution message including the feedback response comprising an identifier indicating a reception of the transmitted information, wherein the identifier comprises a second bitmap matching the first bitmap indicating the requested system information.

12. The method of claim 11, wherein transmitting comprises transmitting a message 3 (msg3) of a random access procedure, wherein the msg3 includes the information requesting the system information.

13. The method of claim 11, wherein transmitting comprises transmitting a message 3 (msg3) of a random access procedure, wherein the msg3 includes the first bitmap indicating the requested system information.

14. The method of claim 11, wherein the MAC-CE comprises the first bitmap indicating the requested system information.

15. A base station, comprising:
- at least one memory; and
- at least one processor coupled with the at least one memory and configured to cause the base station to:
  - receive information requesting system information, wherein the information comprises a first bitmap indicating the requested system information, wherein the requested system information comprises at least one on-demand system information message of a plurality of system information messages, wherein the plurality of system information messages comprises broadcast system information messages and on-demand system information messages; and
  - transmit a contention resolution message including a feedback response comprising an identifier indicating a reception of the transmitted information, wherein the identifier comprises a second bitmap matching the first bitmap indicating the requested system information, and wherein the feedback response comprises a medium access control-control element (MAC-CE).

16. The base station of claim 15, wherein the at least one processor is further configured to cause the UE-base station to:
- transmit a message 3 (msg3) of a random access procedure, wherein the msg3 includes the information requesting the system information.

17. The base station of claim 15, wherein the at least one processor is further configured to cause the UE-base station to:
- transmit a message 3 (msg3) of a random access procedure, wherein the msg3 includes the first bitmap indicating the requested system information.

18. The base station of claim 15, wherein the MAC-CE comprises the first bitmap indicating the requested system information.

19. A processor for wireless communication, comprising:
- at least one controller coupled with at least one memory and configured to cause the processor to:
  - transmit information requesting system information, wherein the information comprises a first bitmap indicating the requested system information, wherein the requested system information comprises at least one on-demand system information message of a plurality of system information messages, wherein the plurality of system information messages comprises broadcast system information messages and on-demand system information messages;
  - monitor for a feedback response in response to the transmitted information, wherein the feedback response comprises a medium access control-control element (MAC-CE); and
  - receive a contention resolution message including the feedback response comprising an identifier indicating a reception of the transmitted information, wherein the identifier comprises a second bitmap matching the first bitmap indicating the requested system information.

* * * * *